July 1, 1969
S. G. HAW
3,453,134
ELECTROSTATIC PIPE COATING METHOD AND APPARATUS
Filed March 3, 1966
Sheet 1 of 2
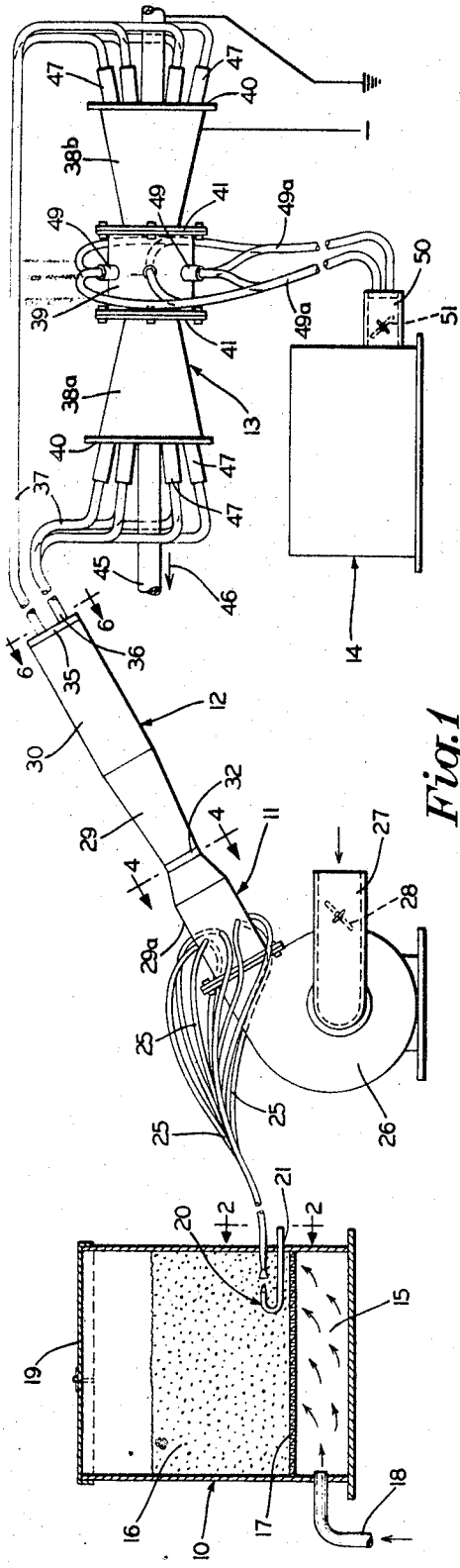
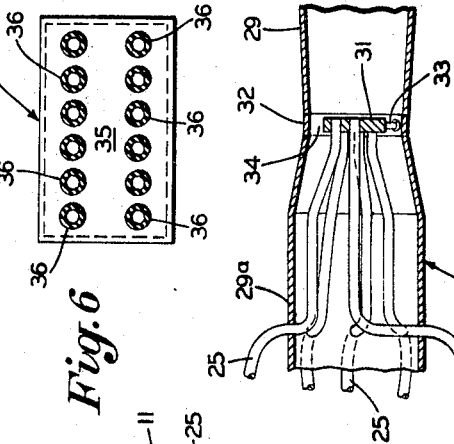
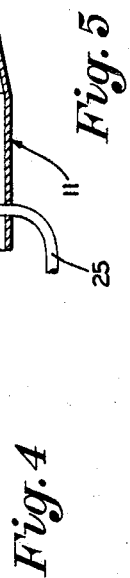
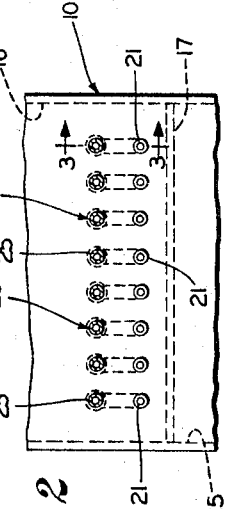
INVENTOR.
Sherwood G. Haw
BY
Frease, Bishop & Schick
ATTORNEYS July 1, 1969 S. G. HAW 3,453,134
ELECTROSTATIC PIPE COATING METHOD AND APPARATUS
Filed March 3, 1966
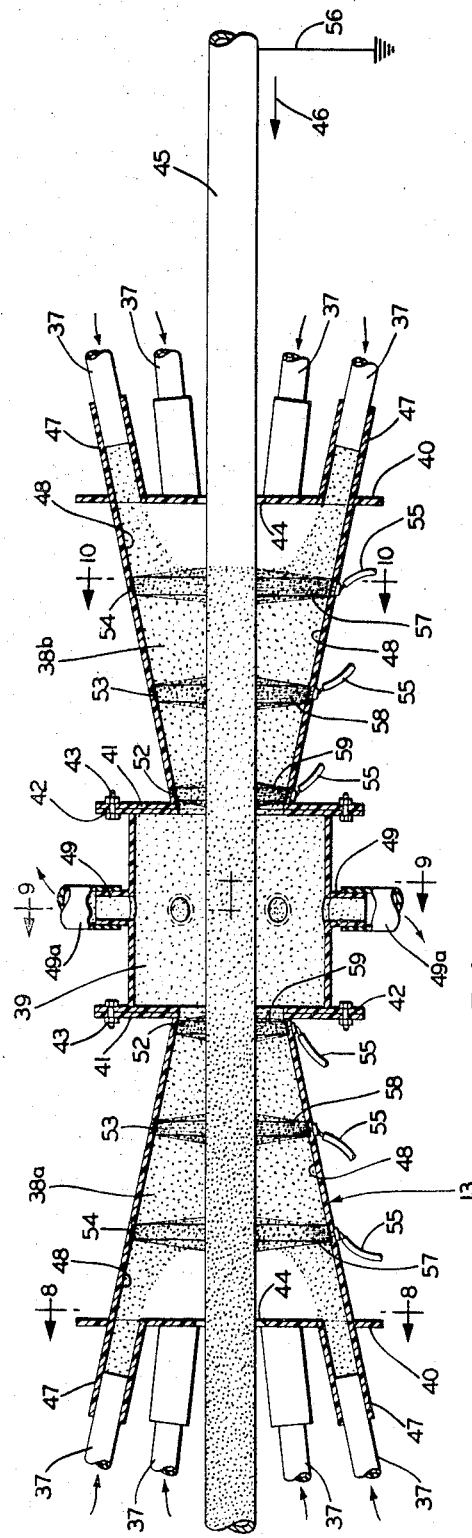
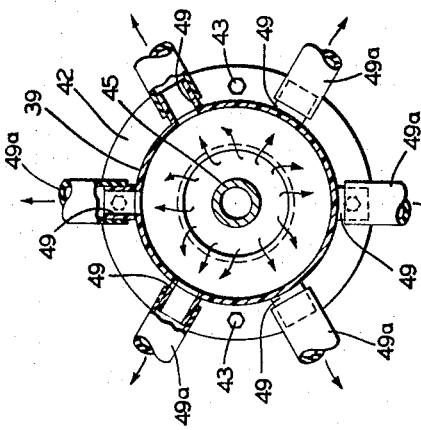
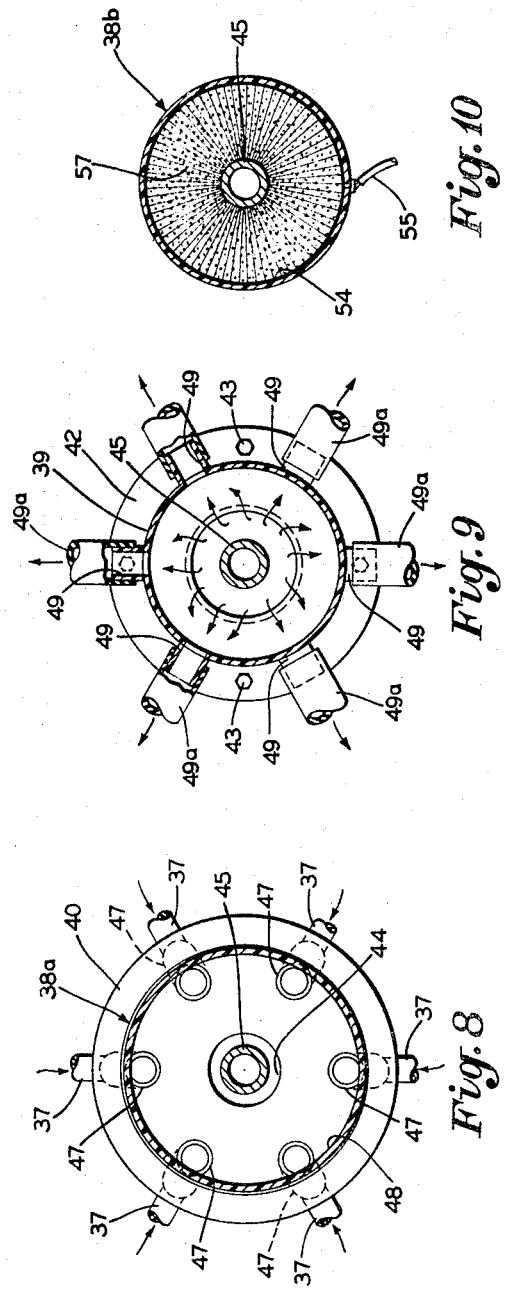
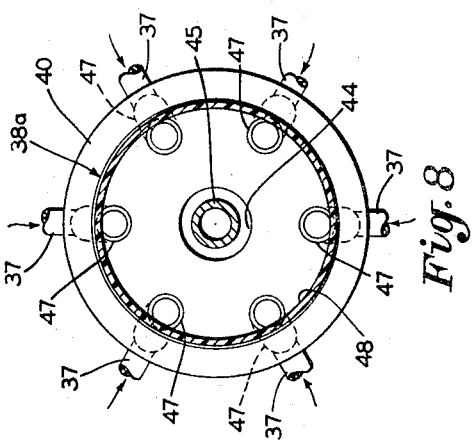
INVENTOR.
Sherwood G. Haw
BY
Frease, Bishop & Schick
ATTORNEYS United States Patent Office 3,453,134
Patented July 1, 1969

3,453,134
ELECTROSTATIC PIPE COATING METHOD AND APPARATUS
Sherwood G. Haw, North Canton, Ohio, assignor to The Banister Corporation, Hubbard, Ohio, a corporation of Minnesota
Filed Mar. 3, 1966, Ser. No. 531,481
Int. Cl. B44d *1/095;* B05b *7/02*
U.S. Cl. 117—17          14 Claims

ABSTRACT OF THE DISCLOSURE

A procedure and equipment for coating metal articles with extremely even and uniform coatings, particularly coatings formed of plastic material fusion bonded to the metal article. The plastic material in powder-like form is fluidized and uniform concentration fluidized streams of the plastic material are discharged under pressure into a coating chamber wherein the uniform concentration fluidized material flows through a series of disc-like electrostatic fields each completely surrounding the article being coated to charge the plastic material and by attraction to deposit it uniformly on the article as the article moves through the chamber. The equipment involves a fluidized bed, a pump, and stream mixing means discharging uniform concentration fluidized material into a coating chamber which has a conical housing wall formed with spaced conductive electrostatic-field-forming rings having the cross-sectional contour matching the similar contour of the article passing through the coating chamber and being coated.

My invention relates to methods and apparatus for coating pipe and other articles, and more specifically, to methods and apparatus for electrostatically coating pipe with plastic material fusion bonded to the pipe while passing continuously through a coating chamber.

Prior plastic coating apparatus for pipe have used various types of coating chambers in which a fog or mist or dust or cloud of entrained comminuted plastic material is supplied or maintained. The article to be coated, heated to required temperature, is passed through the entrained plastic material in such coating chamber. The plastic material has been either thermoplastic or thermosetting plastic material, which, in contacting the hot article, sticks to the article, melts, spreads over the surface thereof, and thereby produces the desired coating upon cooling or curing.

It is extremely difficult with this procedure to control the coating thickness and to maintain uniform coating thickness. Certain coated areas may have a very thin plastic coating, while an excessive coating thickness results in other areas. As a result expensive coating material is wasted in heavily coated areas in order that the coated article has the required coating thickness throughout.

Another procedure has involved spraying comminuted plastic material from guns directed toward the article being coated, with the guns maintained as one pole of an electrostatic field and the article to be coated the opposite pole. The plastic particles in issuing from the guns become charged in the electrostatic field, and are attracted to the article being coated. However, the resulting plastic coating is nonuniform in thickness due to the inherent nonuniformity of the gun spray pattern. The spray cone from any one gun overlaps with the spray cones of adjacent guns to insure a coating having a minimum thickness where there has been no overlap. Thus the zones of overlap may have two or more times the required thickness involving waste.

Objects of the invention are to provide methods and apparatus, for coating metal articles with extremely even and uniform coatings; for coating articles having special shapes with uniform coatings; for coating metal articles with extremely thin, uniform or relatively thick, uniform coatings; and for coating pipe and other articles of virtually any size or diameter as the article moves continuously through a coating chamber.

These and other objects are obtained by the methods, steps, procedures, parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which are particularly and distinctly pointed out and set forth in the appended claims.

One concept of the invention involves forming a fluidized bed of comminuted plastic material, pumping fluidized plastic material from the bed in a series of streams, discharging the series of streams into a single pump mixing and combining chamber to form a combined stream of fluidized plastic material, introducing the combined stream into a coating feed manifold chamber, discharging the fluidized material from the feed chamber in a series of streams into a coating chamber, moving a metal article to be coated, while heated to required coating temperature, as one electrostatic-field-forming pole through the coating chamber, surrounding the article being coated with a series of spaced conductive electrostatic-field-forming rings of opposite polarity having a cross sectional contour matching the cross sectional contour of the article to be coated, applying electrostatic-field-forming potential to said article and rings to form a series of spaced disc-like electrostatic fields in said coating chamber each completely surrounding the article and each extending generally normal to the path of travel of the article through the coating chamber, flowing the fluidized comminuted plastic material discharged into the coating chamber through the series of electrostatic fields to charge the plastic material, the thus-charged plastic material being attracted to and depositing on the heated article as it moves through the coating chamber, controlling the pumping pressure of material pumped from the bed in the series of streams to control the thickness of coating material deposited on the article being coated for any parfticular speed of movement of the article through the coating chamber, the coating material deposited on the heated article moving through the coating chamber fusion bonding to the surface of the article, and exhausting undeposited fluidized material from said coating chamber.

Another concept of the invention involves providing in apparatus for electrostatically plastic coating metal articles, a housing forming a coating chamber having two end sections and a generally tubular center section, the two end sections being formed preferably as truncated cones each connected at its smaller end with the tubular center section, the housing having an end wall at the outer end of each end section formed with an opening through which an article to be coated may be passed axially of the openings and of the end and center sections, means for passing an article to be coated axially through the coating chamber housing, a series of spaced rings of electric conductive material formed on the inner surface of the conical housing end sections, a series of coating material inlet tubes communicating through each housing end wall with each housing end section, the inlet tubes having their inner tubular surfaces extending tangentially with respect to the inner conical surface of the communicating end section and the axes of said inlet tubes being parallel with said inner conical surface, means for flowing under pressure comminuted plastic coating material in uniform-density fluidized streams through said inlet tubes into said coating chamber, means connected with the center housing section maintaining negative pressure with respect to the atmosphere in said coating chamber, means for applying electrostatic field forming potential to said conductive rings and the article to be coated, and the cross-sectional contour of the conductive rings matching the cross-sectional contour of the article to be coated whereby a uniform electrostatic field is formed at each ring completely surrounding the article to be coated and extending from the ring to the article to be coated in a zone generally normal to the path of travel of the article through the coating chamber.

By way of example, the improved apparatus and methods are diagrammatically illustrated in the accompanying drawings forming a part hereof, wherein like numerals indicate similar parts throughout the several views, and in which:

FIG. 1 is a fragmentary side elevation, part in vertical section and somewhat schematic, showing an embodiment of the coating apparatus of the present invention;

FIG. 2, an enlarged fragmentary sectional view, part in elevation, looking in the direction of the arrows 2—2, FIG. 1;

FIG. 3, an enlarged fragmentary sectional view looking in the direction of the arrows 3—3, FIG. 2;

FIG. 4, an enlarged fragmentary sectional view looking in the direction of the arrows 4—4, FIG. 1;

FIG. 5, a reduced fragmentary sectional view looking in the direction of the arrows 5—5, FIG. 4;

FIG. 6, an enlarged sectional view, part in elevation, looking in the direction of the arrows 6—6, FIG. 1;

FIG. 7, an enlarged fragmentary vertical section of the coating and exhaust chamber;

FIG. 8, a fragmentary sectional view taken on line 8—8, FIG. 7;

FIG. 9, a fragmentary sectional view taken on line 9—9, FIG. 7; and

FIG. 10, a fragmentary sectional view taken on line 10—10, FIG. 7.

The improved pipe coating apparatus generally shown in FIG. 1 preferably includes fluid bed means 10, a combining and mixing pump 11, manifold feed means 12, combined coating and exhaust chamber means 13, and collector means 14. The apparatus is illustrated and described with reference to continuously coating pipe and other cylindrical articles, but it should be understood that the invention is not limited to coating cylindrical articles, but the principles of the invention may be used for coating other metal articles having other exterior contours.

Fluid bed means, generally indicated at 10, is for the purpose of entraining in a fluid, in this case air, relatively finely comminuted plastic materials, preferably particles that will flow through about a 200 mesh screen, which comminuted plastic material will ultimately form the plastic coating on the pipe. The plastic coating material used may be any of the powdered plastic resins such, for example, as thermosetting epoxies, or thermoplastic polyethylene, polyvinyl chloride and polyesters.

The fluid bed means 10 is formed by lower air distribution section 15 and upper bed section 16 separated by perforated plate 17. Air under pressure, say 5 p.s.i., is directed into distribution section 15 through inlet pipe 18 and flows upwardly through perforated plate 17 in and around particles of comminuted plastic material fed into bed section 16 through cover 19, thus forming fluidized plastic material, that is, fine particles of plastic material entrained and suspended in air.

The fluidized plastic material is pumped from fluid bed means 10 by a series of pumps 20 located in spaced relation in bed section 16. Thus, continuous quantities of fluidized plastic material are pumped from bed section 16 to combining and mixing pump 11. Pumps 20 may be simple jet-venturi type pumps as shown in FIGS. 1, 2, and 3, each formed by an air inlet tube 21, a jet end portion 22, and an outlet tube 23 having a tapered venturi throat portion 24. Pumps 20 may be operated under a pressure of say 8 to 10 p.s.i., this pressure being varied for control purposes to be described.

The fluidized plastic material from the fluid bed means 10 passes from pumps 20 through a series of preferably flexible tubes 25 connected to outlet tubes 23, to the mixing pump means 11. Pump means 11 preferably includes centrifugal blower 26 having the usual air inlet pipe 27 controlled by adjustable damper 28 and a venturi tube outlet section 29. Venturi tube 29 is connected to manifold 30 of manifold feed means 12.

Flexible tubes 25 through which fluidized plastic material passes (FIGS. 1, 4, and 5) from fluid bed means 10 connect through wall 29a of venturi tube outlet section 29, at the ends of tubes 25 with a perforated plate 31 suspended in spider-like fashion at the throat 32 of venturi section 29 by pins 33.

Thus, air passages 34 are formed around plate 31 at venturi throat 32 surrounding the ends (FIG. 4) of tubes 25 which terminate at spaced locations in plate 31. In this manner the series of streams of fluidized material pumped from fluidized bed 10 and passing through tubes 25 are discharged into and mix and combine in venturi 29 to form a single fluidized stream of plastic material.

Thus, the effect of variations in the concentration of plastic material particles in the various fluidized plastic material streams in tubes 25 which may result from variations in the operation of the several pumps 20 is eliminated by combining and mixing the series of streams into a single combined fluidized stream of plastic material at the throat 32 of the combining and mixing pump 11.

This combined mixed uniform fluidized stream then is introduced into the manifold feed means 12 through manifold 30 connected with the venturi tube outlet section 29. The fluidized plastic material then is discharged from manifold feed means 12 through the outlet end 35, feed tubes 36, and flexible hose 37 into coating chamber means 13. As shown, twelve feed tubes 36 are provided, half of which are connected with one end section 38a of coating chamber means housing 13 and the other half of which are connected with the other end section 38b of coating chamber housing 13 as diagrammatically illustrated in FIG. 1.

The fluidized plastic material thus fed to coating chamber housing 13 is of uniform concentration throughout all the feed tubes 36 because of being fed from the single manifold feed means 12. Thus, the same concentration of fluidized plastic material is fed to the coating chamber 13 from each of the feed tubes 36. This eliminates difficulties heretofore encountered when it was attempted to feed fluidized material from the several pumps 20 through a series of feed tubes directly to the coating chamber. In this latter instance, the fluidized material supplied from the several pumps 20 varied in concentration as a result of variations in the operation of the several pumps 20, and thus material was not introduced uniformly into the coating chamber.

Although twelve feed tubes 36 have been shown, the number of feed tubes may be varied depending upon the volume of fluidized plastic material to be supplied, the size of the coating chamber, and the size of the product to be coated.

The coating chamber means 13 (FIGS. 1 and 7) comprises a housing formed by end sections 38a and 38b and a center section 39. The end sections 38a and 38b are similar and preferably are truncated conically shaped as shown with an outer end wall 40 at the larger end of the cone and a flange 41 at the smaller end of the cone. Center section 39 preferably is generally cylindrical in shape and also is formed with end flanges 42 bolted at 43 to the end section flanges 41 as shown, the sections 38a, 38b, and 39 being axially arranged.

Each end wall 40 preferably is formed with a central opening 44 of sufficient size to permit a pipe 45 or other article to be coated, to be moved axially through the coating housing in the direction of the arrow 46. Each end wall 40 is provided with a series of coating material inlet members 47 with which the flexible tubes 37 are connected. The inlet members 47 are arranged as shown so that their inner cylindrical surfaces are aligned with and tangential to the inner conical surfaces 48 of the end sections 38a and 38b.

Center section 39 has a series of outlet members 49 connected thereto which lead through tubes 49a to a common inlet 50 of the dust collector 14 which may be of usual construction. The relative pressures, or differential pressure between coating chamber means 13 and dust collector means 14 may be controlled by a damper 51 so that a negative pressure with respect to atmospheric may be maintained within the chamber 13.

The housing walls of end sections 38a and 38b and center sections 39 of chamber means 13 are formed of electrical insulation material, and a series of spaced rings 52, 53, and 54 of electrical conductive material are formed in the inner surfaces of the housing end sections. These conductive rings preferably may be provided by painting with electric conductive paint rings 52, 53, and 54 around the inner conical surfaces 48 of end sections 38a and 38b. Any other means of forming electrically conductive rings having surfaces flush with the inner conical surfaces 48 may be used. The number of rings 52–53–54 provided, and ring spacing, each may be varied depending upon the sizes of the coating chamber and the articles to be coated.

As shown, article 45 to be coated is a pipe or tube. In accordance with the invention rings 52, 53, and 54 match in contour the cross-sectional contour of tube 45; so that, for example, any particular point in ring 54 and also in a plane normal to the axes of chamber means 13 and tube 45 is located the same distance from the surface of tube 45 as any other point lying in said plane and in said ring 54.

In accordance with the invention rings 52, 53, and 54 each form one pole of several electrostatic field circuits and are connected by conductors 55 with a source of power. The source of power also is connected to tube 45 as by grounding at 56 so that the tube becomes the other pole of the electrostatic field circuits, whereby an electrostatic field forming potential may be established between the rings 52, 53, and 54 and tube 45 thereby forming a series of electrostatic fields 57, 58, and 59 in each of end sections 38a and 38b.

Thus, an electrostatic field 57, 58, or 59 is formed respectively at each ring 54–53–52 completely and uniformly surrounding the article to be coated and extending from the ring to the article to be coated in a zone generally normal to the path of travel of the article through the coating chamber 13.

Typical equipment for supplying power to energize or charge the electrostatic fields 57, 58, and 59 may be used. Such equipment normally supplies 50,000 to 80,000 volts DC power to provide the necessary electrostatic-field-forming potential.

In operation, the comminuted plastic coating material supplied under pressure in uniform density streams from the manifold feed means 12 to the coating chamber 13 through inlet members 47 fill the coating chamber with suspended or entrained comminuted plastic material. This material flows generally from the region of the end walls 40 of end sections 38a and 38b to the center section 39 within the converging conical walls which decrease in diameter from end walls 40 to section 39. The fluidized plastic material as it flows to center section 39 must pass through the electrostatic fields 57, 58, and 59 in each end section. During passage through the electrostatic fields the particles of plastic material become charged in one or another of the fields. When sufficiently charged the particles then migrate to and deposit on the surface of tube 45 being coated.

It is believed that larger particles become charged first and migrate first to tube 45, and that smaller particles of coating material perhaps after passing through several electrostatic fields become charged and also migrate to the surface of the article to be coated.

Each electrostatic field formed by rings 52, 53, and 54 completely and uniformly surrounds the article to be coated and thus each field forms a vehicle by which the comminuted plastic coating material deposits uniformly on the surfaces of the article to be coated. This uniform deposition of coating material is repeated at each electrostatic field 57, 58, and 59.

Meanwhile, the article to be coated such as tube 45 is moved by usual conveying equipment through the coating chamber 13 at the desired or required speed and while heated to required temperature for bonding the coating material to the article after deposit thereon.

Thus, tube 45 may be moved through the coating chamber at speeds from 60 to 120 feet per minute and tube 45 may be heated to from 350° to 600° F., for example, so that the electrostatically deposited material adheres to or jells on the tube and then cures to or bonds thereto, for example, when thermosetting plastics are used. If thermoplastic material is used for coating, the particles thereof when electrostatically deposited may melt and run over and coat the surface of the tube and then bond thereto and solidify as the tube moves out of the coating chamber.

The thickness of plastic coating ultimately formed on the tube 45 or other article being coated is not only uniform throughout but may be accurately controlled to be as thin as 5 to 7 mils, plus or minus 1 mil. The coating thickness may be increased in either of two ways, other controls remaining the same. The first way is to reduce the speed of the tube as it is passed through the coating chamber. The other way is to increase the pressure at the primary pumps 20 because this increases the concentration of comminuted plastic material in the combined mixed fluidized stream ultimately formed and introduced into the coating chamber.

Actual operation of equipment, such as diagrammatically shown and in accordance with the procedure described, has been used successfully and without difficulty in producing coated pipe with accurate control of coating thicknesses on pipe ranging from ¾" pipe to 8" pipe. Larger diameter pipe say from 12" to 36" pipe also may be coated in the same manner in coating apparatus having coating chamber housings large enough to accommodate the larger diameter pipe and supplied with a sufficient volume of fluidized coating material to deposit the required amount of coating material on the larger diameter pipe.

The volume of material in the fluidized stream and its rate of feed to the coating chamber housing 13 is controlled by adjustment of the intake damper 28 of the main blower 26 and of the dust collector damper 51 of dust collector 14. As indicated, the exhaust pressure established by dust collector 14 preferably is maintained to provide a negative pressure in coating chamber 13 so that air is pulled into the coating chamber around the tube 45 being coated at the entrance and exit openings 44 for the pipe.

Plastic material which passes through and out of the coating chamber and into the dust collector is collected in dust colelctor 14 and may be transferred back to fluid bed means 10.

Although the invention has been described and illustrated in connection with the coating of pipe or tubes which are cylindrical, that is circular in cross-sectional contour, the improved coating procedure may be used to apply plastic coatings on elongated metal articles having other cross-sectional shapes and which pass through the coating chamber. It is preferred that the cross-sectional contour of the coating chamber and particularly of the electrostatic field forming ring poles, such as the rings 52, 53, and 54, should match the cross-sectional contour of the article being coated so that all parts of the ring pole are the same distance from the surface of the article being coated. For example, if the tube 45 is generally square in cross section, the cross-sectional shape of the coating chamber sections 38a and 38b likewise should be generally square in cross section.

One of the fundamental concepts of the invention is the provision of one or more electrostatic fields completely surrounding or encircling the object to be coated and which is passed axially through the encircling electrostatic field, coupled with provisions for flowing suspended particles of comminuted plastic coating material through the electrostatic field so that as the particles pass through the field, they become charged and through attraction of the charged particles are deposited on the outer surface of the object to be coated.

Another aspect of the invention is the provision of one or more encircling electrostatic fields in which each field throughout encirclement is substantially uniform in extent, that is in the distance between all points in a ring-like field-forming pole and the surface of the article being coated acting as the other pole of an electrostatic field circuit. In this manner, uniform deposit of coating material is achieved from a fluidized stream flowing through the coating chamber and through the electrostatic fields.

A third aspect of the invention is the concept of finally mixing into a single stream fluidized material discharged in separate streams from a fluidized bed prior to introducing the fluidized material into the coating chamber. In this manner, nonuniformity in the concentration of fluidized material pumped from a fluidized bed by a plurality of pumps is eliminated and fluidized material of one uniform-concentration is supplied to the coating chamber.

The introduction of uniform-concentration fluidized comminuted plastic coating material into the coating chamber at the various coating material inlets further insures uniformity in the deposition of the comminuted plastic material on the surfaces of the article to be coated from the uniform electrostatic fields completely surrounding the article. However, operation of the equipment does not require supplying fluidized comminuted plastic material to the coating chamber at a plurality of inlets. The required volume of fluidized material may be supplied through a single inlet to the coating chamber and a uniform coating deposited on the article being coated because the uniformity of deposit is dependent upon and controlled primarily by the uniform electrostatic field completely surrounding the article through which the article passes and through which the fluidized comminuted plastic material flows.

Another aspect of the invention involves the alignment and tangential location of the inlet members for the fluidized material discharged into the coating chamber with the inner conical surfaces of the coating chamber end sections. This arrangement minimizes eddy currents and the accumulation or buildup of comminuted material within the coating chamber and most efficiently directs the flow of fluidized material through the electrostatic fields.

Still another feature of the invention resides in the inclined arrangement of the venturi tube 29 connected with main blower 26 of pump means 11. Any tendency of any of the particles of plastic material, because of their sizes or for other reasons, to fall out of the fluidized stream flowing through the venturi tube 29 results in the particle falling downward or backward into the stream being combined at the throat 32 where such falling particle again will be picked up in the flow of the combined fluidized stream formed at the throat 32 of venturi tube 29.

It has been discovered unexpectedly in the operation and use of the new equipment and method that metal objects may be coated with plastic materials which heretofore have been unable to be applied electrostatically, using the electrostatic techniques of the invention.

Extended research has been conducted by others in attempts to electrostatically spray-deposit certain comminuted plastic materials on articles to be coated. These efforts have encountered a so-called "cobwebbing" effect where electrostatic deposit of certain plastic materials has been attempted, such as polyvinyl chloride. For some unaccountable reasons such material, when electrostatically sprayed, forms a stringy-like or fiber-like accumulation which may be likened unto cotton candy formed from sugar. The cobweb-like, or fiber-like, or cotton candy-like masses formed in practicing prior techniques, have prevented this type of plastic material from properly depositing upon or coating the article desired to be coated.

On the other hand, it has been discovered that such plastic material heretofore impossible to deposit may be electrostatically deposited without any difficulty whatsoever using the techniques of the invention. In this manner, it is now possible to coat with materials where desired having properties that could not in the past be used for coating metal objects with plastic.

Accordingly, the present invention provides new apparatus and procedures for the coating of pipe and similar articles with plastic material fusion bonded to the pipe while passing continuously through a coating chamber, and provides solutions to problems longstanding in the art which achieve the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and the new procedures and apparatus are by way of example, and the scope of the invention is not limited to the exact details, sizes, number of components, etc. described or shown because various products may be coated using equipment and procedures incorporating the fundamental concepts of the invention without departing from the principles set forth.

Having now described the features, discoveries and principles of the invention, the characteristics of the new equipment, the manner in which the new procedures may be carried out, and the advantageous, new and useful results obtained thereby; the new and useful methods, steps, procedures, parts, constructions, arrangements, combinations, subcombinations, and discoveries, and mechanical equivalents obvious to those skilled in the art are set forth in the appended claims.

I claim:

1. The method of electrostatically coating elongated metal articles including the steps of discharging fluidized comminuted plastic coating material into a coating chamber, moving a metal article to be coated heated to required coating temperature as one electrostatic-field-forming pole through said chamber, surrounding said article with a series of spaced conductive electrostatic-field-forming rings of opposite polarity, forming the rings with a cross-sectional contour matching the cross-sectional contour of said article, applying electrostatic-field-forming potential to said article and rings to form a series of spaced disc-like electrostatic fields within said chamber each completely surrounding said article and each extending generally normal to the path of travel of said article through said chamber, flowing the fluidized comminuted plastic material discharged into said chamber through the series of electrostatic fields to charge the flowing plastic material, the thus charged plastic material being attracted to and depositing uniformly on said article as the article moves through said chamber, and the coating material deposited on the heated article bonding to the surface of the article.

2. The method set forth in claim 1 in which the discharge of fluidized comminuted plastic coating material into a coating chamber includes forming a fluidized bed of comminuted plastic material, pumping fluidized plastic material from the bed in a series of streams, discharging the series of streams into a single mixing chamber to form a combined single stream of fluidized plastic material, pumping the single stream into a feed chamber, and discharging the fluidized material into the coating chamber from the feed chamber in a series of uniform-concentration streams of fluidized comminuted plastic coating material.

3. The method set forth in claim 1 in which the discharge of fluidized comminuted plastic coating material into a coating chamber includes the steps of forming a fluidized bed of comminuted plastic material, pumping the fluidized plastic material from the bed under pressure in a series of streams, combining the series of streams in a single stream, pumping the single stream through a series of inlets into the coating chamber, and controlling the pumping pressure of the material pumped from the bed in the series of streams to control the thickness of coating material deposited on the article for any particular speed of movement of the article through the chamber.

4. The method set forth in claim 3 in which the pumping pressure of the material pumped from the bed ranges between 8 to 10 p.s.i.

5. The method set forth in claim 1 in which undeposited fluidized material is exhausted from said chamber and collected for reuse.

6. The method set forth in claim 1 in which a negative pressure in respect of atmospheric is maintained in said coating chamber, and in which the fluidized material is discharged into the coating chamber under pressure.

7. The method set forth in claim 1 in which coating material is discharged into the chamber through inlet means, in which undeposited fluidized material is exhausted from said chamber through outlet means, in which the fluidized material flows through a series of electrostatic fields in flowing from inlet means to outlet means, and in which the perimeters of the disc-like fields decrease in size from field to field between inlet and outlet means.

8. The method set forth in claim 1 in which the coating chamber is formed with spaced article inlet and outlet means and with material exhaust outlet means intermediate the article inlet and outlet means, in which the fluidized comminuted plastic material is discharged into said chamber around the article inlet means in a first series of streams and around the article outlet means in a second series of streams, in which a first series of electrostatic fields is formed surrounding the article between the article inlet means and material exhaust outlet means, in which a second series of electrostatic fields is formed surrounding the article between the article outlet means and the material exhaust outlet means; and in which the first and second series of streams flow toward each other respectively through said first and second series of electrostatic fields during flow through said coating chamber.

9. Apparatus for electrostatically coating elongated articles with plastic material including, a housing forming a coating chamber, the housing having end walls formed with aligned entrance and exit openings through which an article to be coated may be passed, means for passing an article to be coated axially through said openings and housing, fluidized comminuted coating material inlet means connected with the housing surrounding at least one of said openings, electrostatic-field-forming means in the housing forming a plurailty of spaced disc-like electrostatic fields extending generally normal to the path of travel of the article through the coating chamber, said spaced disc-like electrostatic fields completely and uniformly surrounding the article while passing through said chamber, means for applying electrostatic-field-forming potential to said electro-static-field-forming means and said article, and means for flowing fluidized comminuted plastic material through said inlet means into said coating chamber and through said spaced electrostatic fields.

10. Apparatus as set forth in claim 9 in which the means for flowing fluidized comminuted plastic material through said inlet means includes fluidized bed means, mixing pump means, feed chamber means, means for pumping fluidized material from the fluidized bed means to the mixing pump means in a series of streams, means for mixing the series of streams in the mixing pump means to form a single stream of fluidized plastic material, and the mixing pump means pumping the single stream from the mixing pump means to the feed chamber means and from the feed chamber means to the coating chamber in a series of uniform-concentration streams of fluidized material.

11. Apparatus as set forth in claim 10 in which the mixing pump means includes a centrifugal pump and a connected venturi tube inclined upwardly at an angle from the horizontal, in which the venturi tube has a throat, and in which the means for mixing the series of streams in the mixing pump means includes a perforated plate suspended in said throat through which the series of streams of fluidized material are pumped from the fluidized bed means into said venturi tube.

12. Apparatus for electrostatically coating elongated articles with plastic material including, a housing forming a coating chamber, the housing having end walls formed with aligned entrance and exit openings through which an article to be coated may be passed, means for passing an article to be coated axially through said openings and housing, fluidized comminuted coating material inlet means connected with the housing surrounding at least one of said openings, the housing being formed with exhaust outlet means, the housing also having at least one conical housing wall extending between one end wall and said exhaust outlet means, a series of spaced conductive electrostatic-field-forming rings formed in the conical housing wall, each of said rings having a cross-sectional contour matching the cross-sectional contour of the article passing through the coating chamber, means for applying electrostatic-field-forming potential to said rings and said article to form a plurality of spaced disc-like electrostatic fields extending generally normal to the path of travel of the article through the coating chamber, and means for flowing fluidized comminuted plastic material through said inlet means into said coating chamber and through said spaced electrostatic fields.

13. Apparatus for electrostatically coating elongated articles with plastic material including, a housing forming a coating chamber having two end sections and a center section, the two end sections each being formed as truncated cones each connected at its smaller end with the center section; the housing having an end wall at the outer end of each end section formed with an opening through which an article to be coated may be passed axially of the openings and of the end and center sections; means for passing an article to be coated axially through the housing; a series of spaced rings of electric conductive material formed on the inner surface of each conical housing end section; a series of coating material inlet tubes communicating through each housing end wall with each housing end section; means for flowing under pressure comminuted plastic coating material in uniform density fluidized streams through said inlet tubes into said chamber; exhaust means connected with the center section maintaining in said chamber negative pressure with respect to the atmosphere; means for applying electrostatic-field-forming potential to said conductive rings and the article to be coated; and the cross-sectional contour of the conductive rings matching the cross-sectional contour of the article to be coated, whereby an electrostatic field is formed at each ring uniformly completely surrounding the article to be coated and extending from the ring to the article to be coated in a zone generally normal to the path of travel of the article through the coating chamber.

14. Apparatus as set forth in claim 13 in which the inlet tubes have their inner tubular surfaces extending tangentially with respect to the inner conical surfaces of the communicating end section, and in which the axes of said inlet tubes are parallel with said inner conical surface.

References Cited

UNITED STATES PATENTS

| | | | |
|---|---|---|---|
| 1,952,502 | 3/1934 | Kinkead | 117—18 X |
| 2,438,561 | 3/1948 | Kearsley | 117—18 X |
| 2,758,564 | 8/1956 | Randall | 118—309 |
| 3,019,126 | 1/1962 | Bartholomew | 117—21 X |
| 3,208,868 | 9/1965 | Strobel et al. | 118—309 X |

FOREIGN PATENTS

| | | |
|---|---|---|
| 728,470 | 1932 | France. |
| 947,386 | 1949 | France. |
| 1,238,170 | 1960 | France. |

WILLIAM D. MARTIN, *Primary Examiner.*

EDWARD J. CABIC, *Assistant Examiner.*

U.S. Cl. X.R.

117—18, 21; 118—309, 634, 638